(12) United States Patent
Kobayashi

(10) Patent No.: US 7,880,441 B2
(45) Date of Patent: Feb. 1, 2011

(54) DC-DC CONVERTER FOR CARRYING OUT CONSTANT OUTPUT POWER CONTROL AND MAINTAINING A SECONDARY BATTERY AT A SET DROOPING VOLTAGE

(75) Inventor: Kimiyoshi Kobayashi, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 716 days.

(21) Appl. No.: 11/795,649

(22) PCT Filed: May 12, 2005

(86) PCT No.: PCT/JP2005/008667
§ 371 (c)(1),
(2), (4) Date: Jul. 19, 2007

(87) PCT Pub. No.: WO2006/120741
PCT Pub. Date: Nov. 16, 2006

(65) Prior Publication Data
US 2008/0129117 A1 Jun. 5, 2008

(51) Int. Cl.
*H02J 7/04* (2006.01)
(52) U.S. Cl. .................. 320/140; 320/101; 307/44; 307/45; 307/46
(58) Field of Classification Search .......... 320/101, 320/140; 307/44, 45, 46
See application file for complete search history.

(56) References Cited

U.S. PATENT DOCUMENTS

| | | | | |
|---|---|---|---|---|
| 4,673,825 A | * | 6/1987 | Raddi et al. | 307/66 |
| 4,916,329 A | * | 4/1990 | Dang et al. | 307/66 |
| 5,182,518 A | * | 1/1993 | Stich et al. | 324/511 |
| 5,254,930 A | * | 10/1993 | Daly | 320/119 |
| 5,483,463 A | * | 1/1996 | Qin et al. | 700/297 |
| 5,532,523 A | * | 7/1996 | Tang | 307/64 |

(Continued)

FOREIGN PATENT DOCUMENTS

JP  62-154121 A  7/1987

(Continued)

OTHER PUBLICATIONS

PCT International Search Report mailed on Aug. 9, 2005.

*Primary Examiner*—Edward Tso
*Assistant Examiner*—Manuel Hernandez
(74) *Attorney, Agent, or Firm*—Ditthavong, Mori & Steiner, P.C.

(57) ABSTRACT

In a DC-DC converter using, as an input source, a fuel cell, a solar cell, or the like, having a relatively large output impedance in a power-supply mode, an arbitrary load and secondary battery based on magnetic coupling in which voltage values are determined by a turns ratio between those wound around a winding, are provided as outputs, a second converter is connected between an output of the secondary battery and the load. In addition, a current control circuit connected to the secondary battery is configured to perform control so that, when a current in the load decreases due to an operation of the magnetic coupling, by increasing a charging current which flows into the secondary battery, and, when the current in the load increases, by decreasing the charging current to the secondary battery, an output voltage of the secondary battery is maintained at a set drooping voltage.

6 Claims, 4 Drawing Sheets

U.S. PATENT DOCUMENTS

| | | | | |
|---|---|---|---|---|
| 5,602,462 | A * | 2/1997 | Stich et al. | 323/258 |
| 5,615,129 | A * | 3/1997 | Stich et al. | 700/297 |
| 5,670,833 | A * | 9/1997 | Mengelt et al. | 307/66 |
| 5,739,595 | A * | 4/1998 | Mekanik et al. | 307/64 |
| 5,909,360 | A * | 6/1999 | Lavin et al. | 307/66 |
| 6,212,081 | B1 * | 4/2001 | Sakai | 363/71 |
| 6,215,272 | B1 * | 4/2001 | Ohara et al. | 320/104 |
| 6,229,286 | B1 * | 5/2001 | Tokuyama | 320/132 |
| 6,232,745 | B1 * | 5/2001 | Tokuyama | 320/132 |
| 6,275,007 | B1 * | 8/2001 | Tokuyama | 320/132 |
| 6,577,513 | B1 * | 6/2003 | Chang et al. | 363/37 |
| 6,800,963 | B2 * | 10/2004 | Miyauchi et al. | 307/86 |
| 7,372,236 | B2 * | 5/2008 | Kobayashi | 320/137 |
| 7,538,451 | B2 * | 5/2009 | Nomoto | 307/66 |
| 7,635,964 | B2 * | 12/2009 | Nomoto | 320/101 |
| 2007/0108943 | A1 * | 5/2007 | Kobayashi | 320/128 |
| 2007/0138996 | A1 * | 6/2007 | Kobayashi | 320/101 |
| 2008/0174276 | A1 * | 7/2008 | Takahashi et al. | 320/128 |

FOREIGN PATENT DOCUMENTS

| | | |
|---|---|---|
| JP | 64-7323 U | 1/1989 |
| JP | 03-253234 A | 11/1991 |
| JP | 03-294912 A | 12/1991 |
| JP | 11-341699 A | 12/1999 |

* cited by examiner

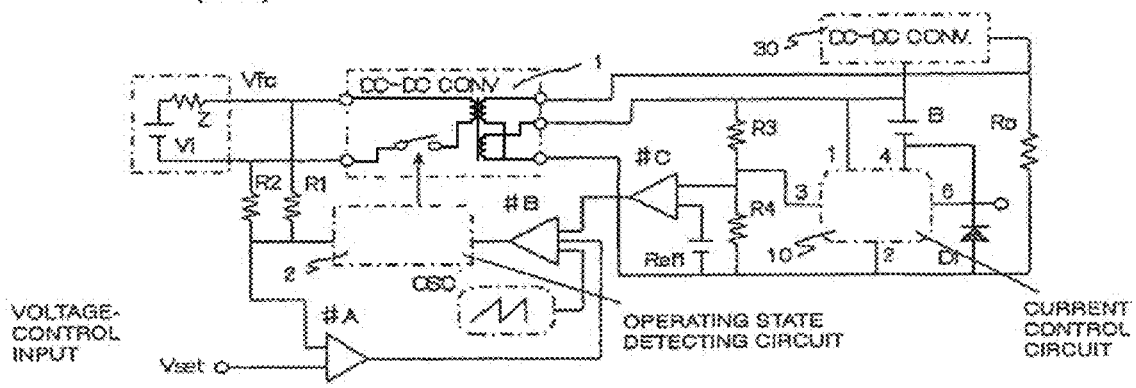
[FIG. 1]
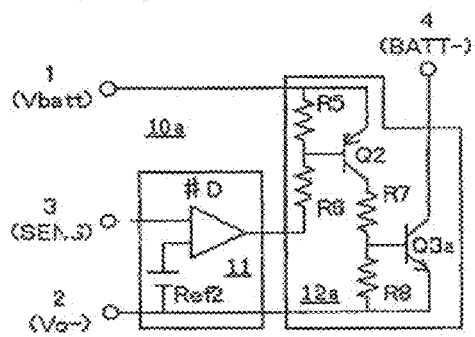
[FIG. 2]
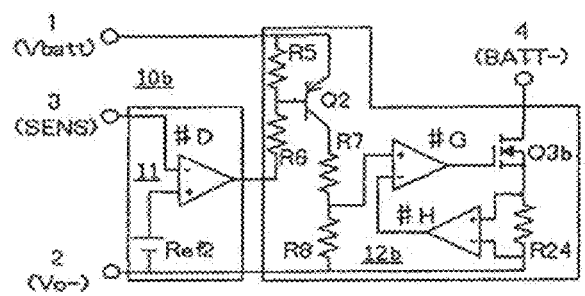
[FIG. 3]

[FIG. 4]
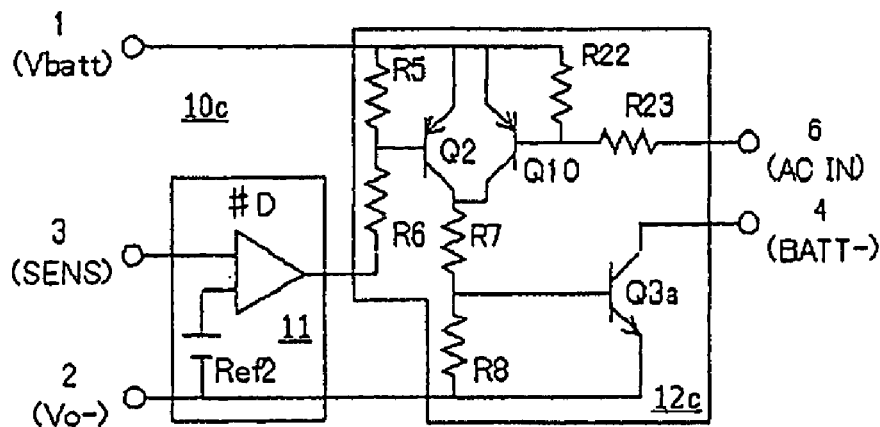
[FIG. 5]
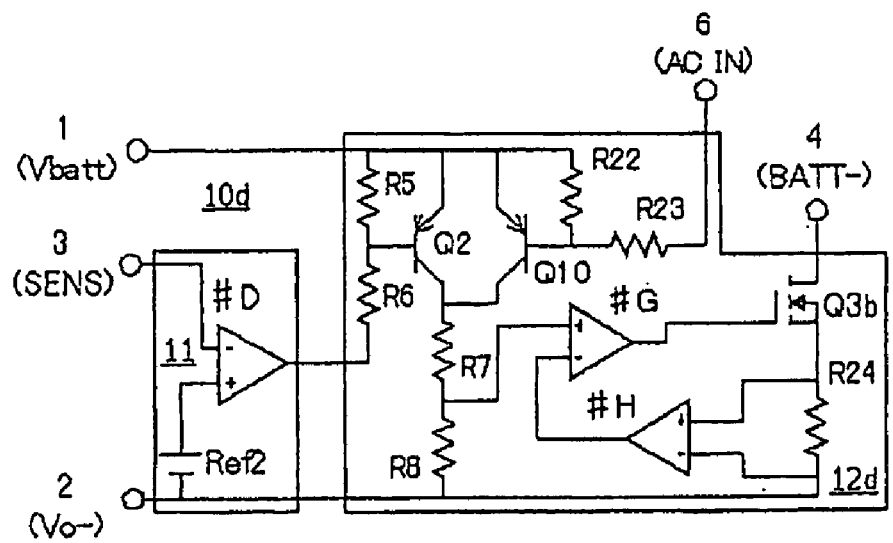
[FIG. 6]
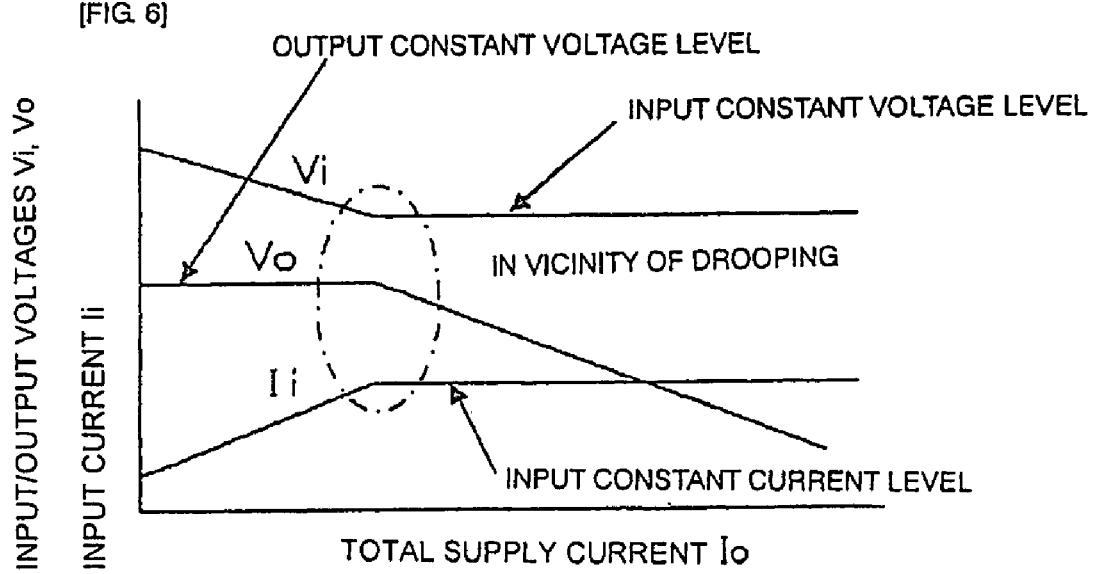

[FIG. 7]
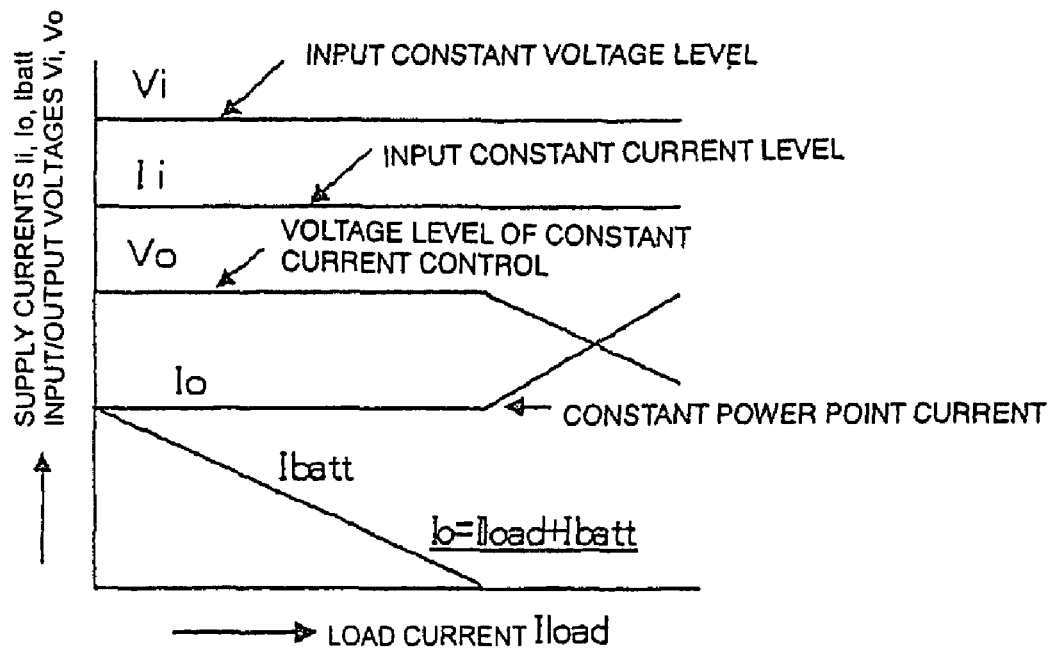
[FIG. 8]
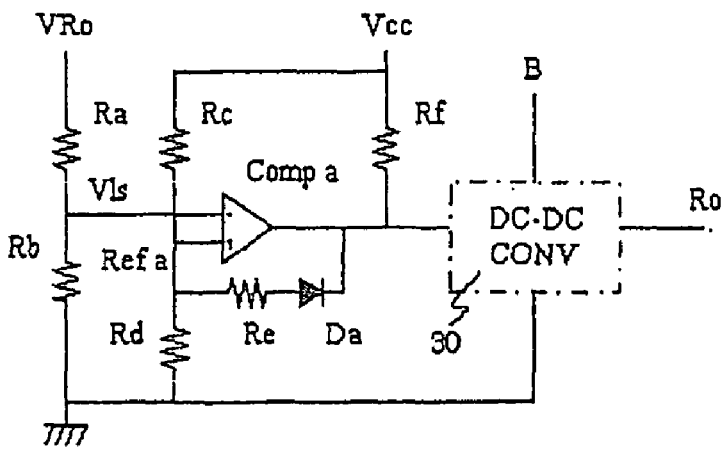
[FIG. 9]
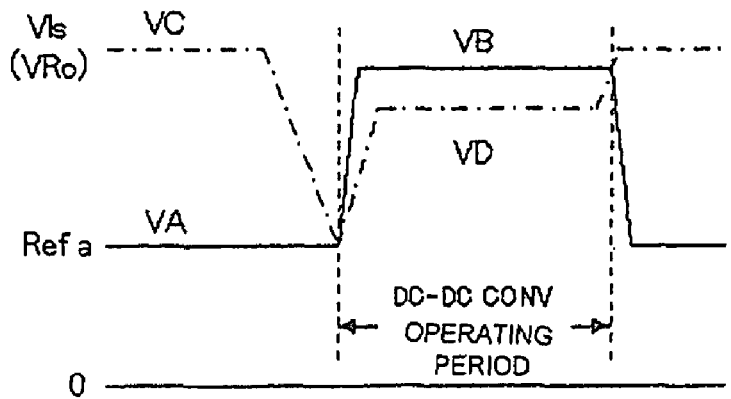

[FIG. 10]
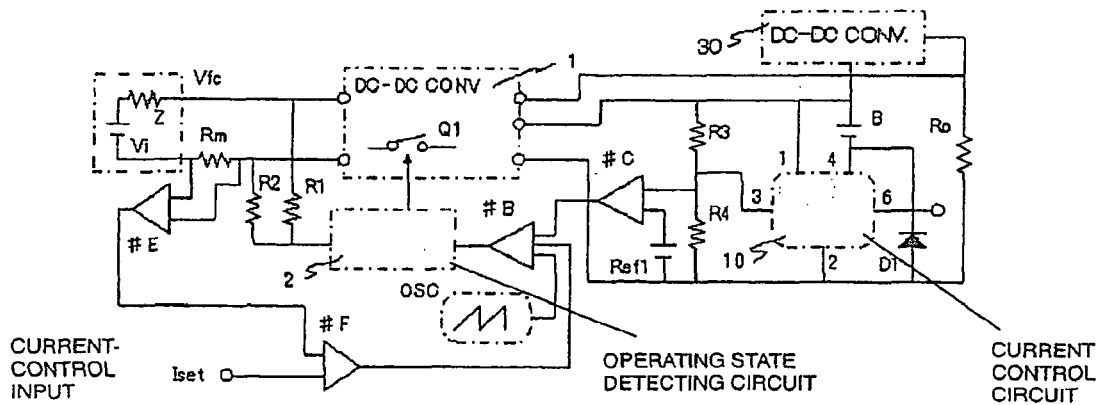
[FIG. 11]
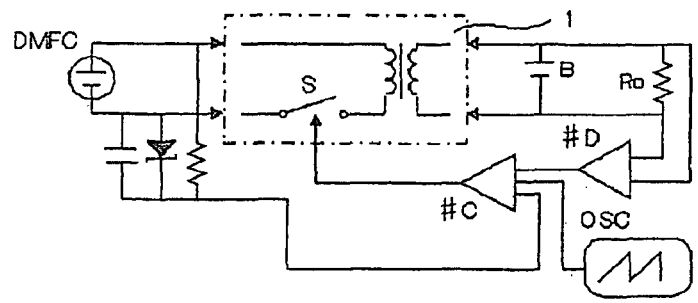
Prior Art

DC-DC CONVERTER FOR CARRYING OUT CONSTANT OUTPUT POWER CONTROL AND MAINTAINING A SECONDARY BATTERY AT A SET DROOPING VOLTAGE

TECHNICAL FIELD

The present invention relates to a DC-DC converter for obtaining necessary power of a fuel cell.

BACKGROUND ART

A DC-DC converter having a charging function, in which a conventional fuel cell, solar cell, or the like is used as an input source, and a load Ro and a secondary battery B are in parallel connected to each other on its output side is shown in FIG. 11. In the DC-DC converter including a DC-DC converter shown in FIG. 11, a means for achieving stabilization of input power by controlling an input voltage to be constant, in which the input voltage is lowered due to an operation of an output impedance in a power-supply mode, has been employed (regarding a solar cell, see, for example, Patent Document 1) in which, when input supply power Pin is less than output supply power Pout, an input voltage is made constant, so that an output voltage enters a drooping state, and in which, when the input supply power Pin is greater than the output supply power Pout, the input voltage rises, so that the output voltage becomes constant.

Patent Document 1: Japanese Laid Open Patent Application Publication No. 11-341699

DISCLOSURE OF INVENTION

Problems to be Solved by the Invention

However, when the input supply power Pin is greater than the output supply power Pout, the input voltage rises. Accordingly, in particular, when a fuel cell is used as an input source, a problem occurs in that a rapid change in voltage environment results in deterioration in a cell because the fuel cell uses chemical reactions to generate power.

The present invention has been made in view of the above problem, in which a novel DC-DC converter for preventing deterioration by carrying out constant power control so as to set a power supply on an output side to be equal to a supply power of a fuel cell on an input side, is provided so that a rise in cell output voltage is suppressed.

Disclosure of Invention

To solve the above problem, a DC-DC converter according to the present invention in which a fuel cell, solar cell, or the like, having a relatively large output impedance is used in a power-supply mode, includes an output to an arbitrary load and an output to a secondary battery, which are configured according to magnetic coupling in which the output is wound around a winding, and based on a turns ratio between the outputs, voltage values of the outputs is determined; a second converter is connected between an output of the secondary battery and the load; and a current control circuit connected to the secondary battery is configured to perform control so that, when a current in the load decreases due to an operation of the magnetic coupling, a charging current flowing into the secondary battery is increased, and, when the current in the load increases, the charging current to the secondary battery is decreased, so as to maintain an output voltage of the secondary battery at a set drooping voltage.

The current control circuit includes comparing means which outputs a control variable by comparing the output voltage of the secondary battery and a reference voltage, and a semiconductor switch which is turned on and off in response to the control variable, and the current control circuit further includes constant current control means which performs constant current control of the secondary battery on the basis of the turning on and off.

The constant current control means includes first level conversion means which connects to an output portion of the comparing means. The first level conversion means is connected to a positive output end of the secondary battery and to a control terminal of the semiconductor switch. Second level conversion means is connected to an output terminal of the semiconductor switch. The second level conversion means is connected to a negative output end of the DC-DC converter and to a control terminal of a second semiconductor switch. An output terminal of the second semiconductor switch is connected to an input terminal of the secondary battery, and the DC-DC converter is configured to perform control so that, when the current in the load decreases, the charging current which flows into the secondary battery is increased, and, when the current in the load increases, the charging current to the secondary battery is decreased so as to maintain the output voltage of the secondary battery at the set drooping voltage.

The DC-DC converter has a function which performs detection of a voltage of the input source, control by comparing the detected voltage with a voltage-control input capable of being arbitrarily set, and control of an input voltage to be constant on the basis of the control variable.

Advantages

According to the present invention, a load and a secondary battery are provided on an output side and a current control circuit is connected to the secondary battery in which a decrease in load current causes the current control circuit to increase a charging current to the secondary battery, while an increase in load current causes a decrease in charging current to the secondary battery, so that the entire output supply power can be constant, and an input voltage (for example, a fuel cell output) can be controlled to become a constant voltage.

In addition, according to a DC-DC converter of the present invention, since an output voltage becomes stable at a set drooping point, stable power can be supplied to a load.

Furthermore, according to a DC-DC converter of the present invention, two converters, a converter for controlling supplied fuel cell power to be stable and a load-voltage-adjusting converter, are integrated by setting a single converter to have outputs, so that the integration is effective for a system that requires high efficiency.

BRIEF DESCRIPTION OF THE DRAWINGS

FIG. 1 is a circuit diagram of a best mode for practicing the present invention in a DC-DC converter of the present invention.

FIG. 2 is a circuit diagram showing an embodiment of a main part of the DC-DC converter of the present invention.

FIG. 3 is a circuit diagram showing another embodiment different from that in FIG. 2.

FIG. 4 is a circuit diagram showing still another embodiment different from those in FIGS. 2 and 3.

FIG. 5 is a circuit diagram showing yet another embodiment different from those in FIGS. 2 to 4.

FIG. 6 is an operating waveform chart showing power characteristics in a case in which a current control circuit does not function.

FIG. 7 is an operating waveform chart showing power characteristics in a case in which a current control circuit functions.

FIG. 8 is a circuit diagram showing an embodiment of the main part of the DC-DC converter of the present invention.

FIG. 9 is an operating waveform chart of the vicinity of a second converter.

FIG. 10 is a circuit diagram of another embodiment of a DC-DC converter different from the DC-DC converter shown in FIG. 1.

FIG. 11 is a circuit diagram of a DC-DC converter of the related art which has a charging function.

REFERENCE NUMERALS

Vfc Input source (fuel cell)
Vset Voltage control input
VRo Load voltage
Vbatt Charge voltage
Vls Comparison voltage
Ibatt Charge current
Ro Load
B Secondary battery
1 First converter
2 Operating state detecting circuit
10, 10*a*, 10*b*, 10*c*, 10*d* Current control circuits
11 Comparing circuit
12*a*, 12*b*, 12*c*, 12*d* Constant-current control circuits
20 Charging circuit
30 Second converter
A, #F Differential amplifiers
B, Comp a comparators
C Voltage detector
D, #E, #G, #H Amplifiers
Q1 First-converter-1 control switch
Q2, Q3*a*, Q3*b*, Q10 Semiconductor switches
R1, R2 Resistors
R3, R4, R5, R6, R7, R8, R22, R23, Ra, Rb, Rc, Rd Voltage-dividing resistors
Rm, R24 Current-detection resistors
Ref1, Ref2, Refa Reference voltages
D1, Da Diodes

BEST MODE FOR CARRYING OUT THE INVENTION

A circuit diagram of a best mode for practicing the invention is shown in FIG. 1. The DC-DC converter shown in FIG. 1 uses, as an input source Vfc, a fuel cell having relatively large output impedance Z in a power-supply mode. In this embodiment, the fuel cell is used as the input source Vfc. However, by using even a solar cell or another one having a relatively large output impedance, the present invention can be practiced. The DC-DC converter includes a first converter 1. An output to a load Ro and an output to a secondary battery B are connected as two outputs to an output side of the first converter 1. A second converter 30 is connected between the secondary battery B and the load Ro.

Voltage-dividing resistors R3 and R4 are connected to the output of the first converter 1 for the secondary battery B, and a current control circuit 10 is connected to a node between the resistors R3 and R4. The current control circuit 10 is also connected to a negative electrode of the secondary battery B. In the current control circuit 10, a decrease in current flowing through the load Ro can increase a charging current Ibatt which flows into the secondary battery B. Also, the current control circuit 10 is controlled so that an increase in current flowing through the load Ro can decrease the charging current Ibatt flowing through the secondary battery B, whereby an output voltage can be maintained at a set drooping voltage. A specific embodiment of the current control circuit 10 is described later.

The DC-DC converter of the present invention also includes a voltage comparator #C. The voltage comparator #C can perform level conversion by comparing an output voltage signal detected by the voltage-dividing resistors R3 and R4 and reference voltage Ref1, and can output the obtained result to a comparator #B connected to an output of the voltage comparator #C.

The DC-DC converter of the present invention includes a differential amplifier #A. The differential amplifier #A is externally provided and is configured so that an arbitrary value of voltage-control input Vset for controlling input voltage Vfc of the DC-DC converter, and an output voltage of the fuel cell, that is, input voltage Vfc of the DC-DC converter, can be received as inputs, and a control signal for setting input voltage Vfc to be equal to the voltage-control input Vset can be output.

The voltage-control input Vset can be given by the following expression:

$$Vset = Vfc * R2/(R1+R2)$$

For example, when a battery output needs to be controlled to 5 V with R1=R2=1 kΩ, Vset=5V*1k/(1k+1k)=2.5 V. Accordingly, 2.5 V may be an external input.

The comparator #B can output a driving signal to a control switch Q1 of a first-converter 1 through an operating state detecting circuit 2, which is described later, by comparing a voltage signal from the voltage comparator #C which is obtained by performing the level conversion on output voltage Vbatt of the secondary battery B with a control signal which is oscillated for stable control by a triangular-wave oscillator (OSC).

The DC-DC converter of the present invention includes the operating state detecting circuit 2. The operating state detecting circuit 2 is a circuit which detects whether the fuel cell is in an operable state by comparing a compensating voltage with an output voltage of the fuel cell every predetermined time, in which, when the output voltage of the fuel cell becomes lower than the compensating voltage, the circuit stops an operation of the control switch Q1 for a switching power supply, and, when the output voltage of the fuel cell exceeds the compensating voltage, the circuit allows the control switch Q1 for the switching power supply to normally operate. Since the operating state detecting circuit 2 is provided for temporary measures, it is not always required.

Next, an embodiment of the current control circuit 10 is shown in FIG. 2 and is described. A current control circuit 10*a* in this embodiment includes a comparing circuit 11 for outputting a control variable by comparing output voltage Vbatt of the first converter 1 for the secondary battery B with a reference voltage Ref2, and a constant-current control circuit 12*a* for performing constant current control of the secondary battery B by using the control variable. The comparing circuit 11 includes an amplifier #D and is configured to output the control variable after performing a level conversion by the comparator #D for comparing the output voltage Vbatt with the reference voltage Ref2.

The constant-current control circuit 12*a* includes voltage-dividing resistors R5 and R6. An end of the voltage-dividing resistor R5 is connected to a positive output end of the output of the first converter 1 for the secondary battery B, and another end of the voltage-dividing resistor R6 is connected to an output terminal of the amplifier #D. Also, a control terminal of a semiconductor switch Q2 is connected to a node between the voltage-dividing resistors R5 and R6, and the constant-current control circuit 12a further includes voltage-dividing resistors R7 and R8. An end of the voltage-dividing resistor R7 is connected an output terminal of the semiconductor switch Q2, and another end of the voltage-dividing resistor R8 is connected to a negative output end of the first converter 1.

In addition, a control terminal of a second semiconductor switch Q3a is connected to a node between the voltage-dividing resistors R7 and R8, and the second semiconductor switch Q3a is connected to a negative terminal of the secondary battery B. Accordingly, when the output voltage rises, by turning on the semiconductor switch Q2 and the second semiconductor switch Q3a to supply power to the secondary battery B at a constant current, the output voltage Vbatt of the first converter 1 for the secondary battery B can be lowered to a voltage determined by the reference voltage Ref2.

In addition, when the output voltage drops, by turning off the semiconductor switch Q2 and the second semiconductor switch Q3a to suppress power supply to the secondary battery B, the output voltage Vbatt of the first converter 1 for the secondary battery B can be raised to the voltage determined by the reference voltage Ref2.

Regarding a relationship between the output voltage Vbatt of the first converter 1 for the secondary battery B and output voltage VRo for the load Ro, since the two outputs have a so-called multi-output configuration in which both are magnetically coupled in a winding used in the first converter 1 for power supply, the output voltage VRo is determined by a turns ratio between their windings (if the numbers of turns are the same, two output voltages are the same). As a result, the output voltage VRo to the load Ro is controlled to a voltage value, depending on the output voltage Vbatt for the secondary battery B, detected and controlled by the voltage-dividing resistors R3 and R4. This can apply to the following embodiments of the current control circuit 10.

Next, an embodiment of another current control circuit 10b is shown in FIG. 3. The current control circuit 10b includes a comparing circuit 11 for outputting a control variable by comparing the output voltage Vbatt of the first converter 1 for the secondary battery B with the reference voltage Ref2, and a constant-current control circuit 12b for performing constant current control of the secondary battery B by using the control variable. The comparing circuit 11 includes an amplifier #D and is configured to output the control variable after performing a level conversion by comparing the output voltage with the reference voltage Ref2 by the amplifier #D.

The constant-current control circuit 12b includes voltage-dividing resistors R5 and R6. An end of the voltage-dividing resistor R5 is connected to a positive output end of the output of the first converter 1 for the secondary battery B, and another end of the voltage-dividing resistor R6 is connected to an output terminal of the amplifier #D. In addition, a control terminal of the semiconductor switch Q2 is connected to a node between the voltage-dividing resistors R5 and R6, and the constant-current control circuit 12b further includes voltage-dividing resistors R7 and R8. An end of the voltage-dividing resistor R7 is connected to an output terminal of the semiconductor switch Q2, and another end of the voltage-dividing resistor R8 is connected to a negative terminal of the first converter 1.

A detection terminal of an amplifier #G is connected to a node between the voltage-dividing resistors R7 and R8, and an output terminal of the amplifier #G is connected to a gate terminal of a second semiconductor switch Q3b comprising an FET. The second semiconductor switch Q3b is connected to a negative terminal of the secondary battery B. In addition, an end of a current detecting resistor R24 is connected to a source terminal of the second semiconductor switch Q3b, both ends of the current detecting resistor R24 are connected to both input terminals of an amplifier #H, and an output terminal of the amplifier #H is connected to a reference terminal of the amplifier #G, whereby a feedback operation is performed. Accordingly, when the output voltage rises, the semiconductor switch Q2 and the second semiconductor switch Q3b are turned on to supply power to the secondary battery B at a constant current, whereby the output voltage Vbatt of the DC-DC converter for the secondary battery B can be controlled to be lowered to a voltage determined by the reference voltage Ref2. At this time, the maximum value of the constant current can be limited by the voltage-dividing resistors R7 and R8. Thus, charging current Ibatt of the secondary battery B can be arbitrarily set, thus realizing a secure system.

In addition, when the output voltage drops, the semiconductor switch Q2 and the second semiconductor switch Q3b are turned off to suppress power supply to the secondary battery B, whereby the output voltage Vbatt of the DC-DC converter for the secondary battery can be controlled to rise to the voltage determined by the reference voltage Ref2.

Next, an embodiment of still another current control circuit 10c is shown in FIG. 4 and is described. The current control circuit 10c includes a comparing circuit 11 for outputting a control variable by comparing the output voltage Vbatt of the DC-DC converter for the secondary battery B with the reference voltage Ref2, and a constant-current control circuit 12c for performing constant current control of the secondary battery B by using the control variable. The comparing circuit 11 includes an amplifier #D and is configured to output the control variable after performing a level conversion by comparing the output voltage with the reference voltage Ref2 by the amplifier #D.

The constant-current control circuit 12c includes voltage-dividing resistors R5 and R6. An end of the voltage-dividing resistor R5 is connected to a positive output end of the output of the first converter 1 for the secondary battery B, and another end of the voltage-dividing resistor R6 is connected to an output terminal of the amplifier #D. Also, a control terminal of the semiconductor switch Q2 is connected to a node between the voltage-dividing resistors R5 and R6, and the constant-current control circuit 12c further includes voltage-dividing resistors R7 and R8. And an end of the voltage-dividing resistor R7 is connected to an output terminal of the semiconductor switch Q2, and another end of the voltage-dividing resistor R8 is connected to a negative output end of the first converter 1.

In addition, a control terminal of a second semiconductor switch Q3 is connected to a node between the voltage-dividing resistors R7 and R8, and the second semiconductor switch Q3a is connected to a negative terminal of the secondary battery B. Accordingly, when the output voltage rises, the semiconductor switch Q2 and the second semiconductor switch Q3a are turned on to supply power to the secondary battery B at a constant current, whereby the output voltage Vbatt of the first converter 1 to the secondary battery B can be lowered to the voltage determined by the reference voltage Ref2.

In addition, when the output voltage drops, the semiconductor switch Q2 and the second semiconductor switch Q3a are turned off to suppress power supply to the secondary battery B, whereby the output voltage Vbatt of the first converter 1 for the secondary battery B is configured to rise to the voltage determined by the reference voltage Ref2.

The constant-current control circuit 12c also includes a semiconductor switch Q10. Input/output terminals of the semiconductor switch Q10 are connected in parallel to input/output terminals of the semiconductor switch Q2. The constant-current control circuit 12c includes voltage-dividing resistors R22 and R23. An end of the voltage-dividing resistor R22 is connected to a positive output end of the output of the first converter 1 for the secondary battery B, and another end of the voltage-dividing resistor R23 is connected to an AC input terminal. In addition, a control terminal of the semiconductor switch Q10 is connected to a node between the voltage-dividing resistors R22 and R23. Power can be input from the outside so that, when the power is input from an AC adapter, an AC input terminal becomes low, and a stop signal can be simultaneously sent to the converter. Also, when the semiconductor switch Q10 is turned on to initiate charging with a current from the AC adapter, the semiconductor switch Q3a enters an on-state, so that the secondary battery B is charged at a constant current. The charging current decreases as charging voltage of the secondary battery B rises.

Next, yet another embodiment of a different current control circuit 10d is shown in FIG. 5. Also in this embodiment, the current control circuit 10d includes a comparing circuit 11 for outputting a control variable by comparing the output voltage Vbatt of the first converter 1 for the secondary battery B with the reference voltage Ref2, and a constant-current control circuit 12d for performing constant current control of the secondary battery B by using the control variable. The comparing circuit 11 includes an amplifier #D and is configured to output the control variable after performing a level conversion by comparing the output voltage Vbatt with the reference voltage Ref2 by the comparator #D.

The constant-current control circuit 12d includes voltage-dividing resistors R5 and R6. An end of the voltage-dividing resistor R5 is connected to a positive output end of the output of the first converter 1 for the secondary battery B, and another end of the voltage-dividing resistor R6 is connected to an output terminal of the amplifier #D. Also, a control terminal of a semiconductor switch Q2 is connected to a node between the voltage-dividing resistors R5 and R6, and the constant-current control circuit 12d further includes voltage-dividing resistors R7 and R8. An end of the voltage-dividing resistor R7 is connected to an output terminal of the semiconductor switch Q2, and another end of the voltage-dividing resistor R8 is connected to a negative terminal end of the first converter 1.

In addition, a detection terminal of an amplifier #G is connected to a node between the voltage-dividing resistors R7 and R8, and an output terminal of the amplifier #G is connected to a gate terminal of a second semiconductor switch Q3b comprising an FET. The second semiconductor switch Q3b is connected to a negative terminal of the secondary battery B. An end of a current detecting resistor R24 is connected to a source terminal of the second semiconductor switch Q3b, both ends of the current detecting resistor R24 are connected to both input terminals of an amplifier #H, and an output terminal of the amplifier #H is connected to a reference end of the amplifier #G, whereby a feedback operation is performed. Accordingly, when the output voltage rises, the semiconductor switch Q2 and the second semiconductor switch Q3b are turned on to supply power to the secondary battery B at a constant current, whereby the output voltage Vbatt of the first converter 1 for the secondary battery B can be controlled to be lowered to the voltage determined by the reference voltage Ref2. At this time, the maximum value of the constant current can be controlled by the voltage-dividing resistors R7 and R8. Thus, the charging current Ibatt of the secondary battery B can be arbitrarily set, thereby realizing a secure system.

In addition, when the output voltage drops, the semiconductor switch Q2 and the second semiconductor switch Q3b are turned off to suppress power supply to the secondary battery B, whereby the output voltage Vbatt to the secondary battery B of the first converter 1 is controlled to rise to the voltage determined by the reference voltage Ref2.

The constant-current control circuit 12d also includes a semiconductor switch Q10. Input/output terminals of the semiconductor switch Q10 are connected in parallel to input/output terminals of the semiconductor switch Q2. The constant-current control circuit 12c includes voltage-dividing resistors R22 and R23. An end of the voltage-dividing resistor R22 is connected to a positive output end of the output of the first converter 1 for the secondary battery B, and another end of the voltage-dividing resistor R23 is connected to an AC input terminal. In addition, a control terminal of the semiconductor switch Q10 is connected to a node between the voltage-dividing resistors R22 and R23. Power can be input from the outside so that, when the power is input from an AC adapter, an AC input terminal becomes low, and a stop signal is simultaneously sent to the converter. Also, when the semiconductor switch Q10 is turned on to initiate charging with a current from the AC adapter, the semiconductor switch Q3b enters an on-state, so that the secondary battery B is charged at a constant current. The charging current Ibatt decreases as charging voltage of the secondary battery B rises.

Furthermore, the present invention has a feature in that a second converter 30 is provided between the output of the secondary battery B and the load Ro. This embodiment is shown in FIG. 8. The second converter 30 is provided with a terminal for controlling starting/stopping by using a signal input (for example, high/low). Accordingly, a control signal to be input to this terminal can be set. For a start/stop voltage of the second converter 30, a voltage dividing circuit including resistors Rc and Rd, and a hysteresis circuit including a resistor Re and diode Da connected in series are provided. The voltage dividing circuit and the hysteresis circuit are used to generate reference voltage Refa, and the reference voltage Refa is input as a signal to one input of a comparator Comp a. Also, comparison voltage Vls, detected by using the resistors Ra and Rb to divide load voltage VRo, is input to the other input of the comparator Comp a. The second converter 30 is connected to the output of the comparator Comp a so that the starting/stopping of the second converter 30 is controlled by a signal input.

The above-configured DC-DC converter has the operation as set forth below. Power characteristics obtained when the current control circuit does not function are shown in FIG. 6, and power characteristics obtained when the current control circuit functions are shown in FIG. 7. Also, operating characteristics of the second converter 30 are shown in FIG. 9. In this embodiment, regarding a turn ratio for voltage adjustment between an output voltage for the secondary battery B and an output voltage for the load Ro which are generated by magnetic coupling of a winding in the first converter 1, the numbers of turns of both are equal to each other. Thus, Vo=VRo=Vbatt.

In the DC-DC converter of the present invention, in a normal mode, power is supplied from the input source Vfc to the load Ro through the first converter 1. At this time, in order to start or stop the second converter 30, the reference voltage Refa and the comparison voltage Vls are input to the comparator Comp a. At this time, an input condition (initial stage) of the comparator Comp a is "Vls>Refa", and an output of the comparator Comp a is maintained to be low. Accordingly, the reference voltage Ref a is set to a low voltage value by a set value of the hysteresis circuit (the VA shown in FIG. 9).

Next, when a current flowing in the load Ro is in a state (drooping) is equal to or greater than a rating, as shown in FIG. 6, the current control circuit 10 does not function, and currents are supplied from the second converter 30 and the secondary battery B. The secondary battery B performs power supply through a diode D1.

Next, an operation of the second converter 30 in a case in which a main circuit operation stops or in which the current flowing in the load Ro is in a state (drooping) in which it is equal to or greater than a rating is described. When an output drooping or the like causes the comparison voltage Vls as well as the load voltage VRo to drop to reach the reference voltage Refa, the output of the comparator Comp a is inverted and changes to be high. At this time, by inputting a start signal (high) to the second converter 30 through a resistor Rf provided between the output of the comparator Comp a and auxiliary-power-supply voltage Vcc, the second converter 30 starts to operate, so that a current is supplied to the main circuit. In addition, since the output of the comparator Comp a is changed to be high thereby separating the hysteresis circuit, the reference voltage Refa is set by only the voltage dividing circuit, so that reference voltage Refa rises (the VB shown in FIG. 9). In this embodiment, the reference voltage Refa is set to VA and VB, and VD is used as a load voltage setting of the second converter 30, and VC is used as a main-circuit load voltage setting so that these voltages are set to have "VA<VD<VB<VC".

Next, a case in which load current Iload decreases in a normal state is described. As shown in FIG. 7, a drop in load current Iload causes a rise in output voltage Vo. When output voltage Vo rises to exceed the reference voltage Ref2, a negative control variable is output from the amplifier #D provided in the current control circuit 10. The control variable is output to the control terminal of the semiconductor switch Q2 through the voltage-dividing resistors R5 and R6, whereby the semiconductor switch Q2 is turned on. In addition, when the control variable is output to the control terminal of the second semiconductor switch Q3, whereby the semiconductor switch Q3 is turned on, the charging current Ibatt flowing in the secondary battery B increases, so that output supply power Pout becomes constant. This can also stabilize the output voltage Vo at a drooping point.

Next, a case in which the load current Iload increases is described. As shown in FIG. 7, an increase in load current Iload causes a drop in output voltage Vo. When the output voltage Vo drops to be below the reference voltage Ref2, a positive control variable is output from the amplifier #D provided in the current control circuit 10. The control variable is output to the control terminal of the semiconductor switch Q2 through the voltage-dividing resistors R5 and R6, whereby the semiconductor switch Q2 is turned off. In addition, when the control variable is output to the control terminal of the second semiconductor switch Q3 through the voltage-dividing resistors R7 and R8, whereby the semiconductor switch Q3 is turned off, the charging current Ibatt flowing in the secondary battery B decreases, so that the output supply power Pout becomes constant. This can also stabilize the output voltage Vo at a drooping point.

Next a modification of the DC-DC converter of the present invention is shown in FIG. 10. The DC-DC converter shown in FIG. 10 is provided in the outside and is configured as described below so as to receive an arbitrary value of current control input Iset for controlling an input current of the DC-DC converter, and an output current of an input source Vfc, that is, an input current Ifc of the DC-DC converter, and so as to output a control signal for setting the input current Ifc to be equal to the current control input Iset. First, in this embodiment, a current detecting resistor Rm is provided at an output end of an input source Vfc, and the current detecting resistor Rm is used to detect the electric potential between an input and an output. The input and output of the current detecting resistor Rm are connected to input terminals of an amplifier #E, and the amplifier #E is used to amplify a current compensating voltage. The input of the current detecting resistor Rm is connected to a minus input terminal of the amplifier #E, and the output of the current detecting resistor Rm is connected to a plus input terminal of the amplifier #E.

In this embodiment, a differential amplifier #F is provided. The differential amplifier #F is provided in the outside and is configured so that, by inputting an arbitrary value of the current-control input Iset for controlling the input current of the DC-DC converter and an output current of the input source Vfc, that is, input current Ifc of the DC-DC converter, the differential amplifier #F outputs a control signal to a comparator #B. Since the other components are substantially similar to the DC-DC converter shown in FIG. 1, their descriptions are omitted.

This embodiment differs from the DC-DC converter shown in FIG. 1 in that, as described below, in an outside, by inputting the arbitrary value of the current-control input Iset for controlling the input current of the DC-DC converter and the output current of the input source Vfc, that is, the input current Ifc of the DC-DC converter, the control signal is output. However, its operation is substantially similar to that of the DC-DC converter shown in FIG. 1 since it has a relationship in which, as the input current Ifc increases, the input voltage Vfc drops in proportion thereto.

INDUSTRIAL APPLICABILITY

According to a DC-DC converter of the present invention, by employing a configuration in which a load and a secondary battery are provided in an output side thereof and a current control circuit is connected to the secondary battery so that a decrease in load current causes the current control circuit to increase a charging current to the secondary battery, while an increase in load current causes a decrease in charging current to the secondary battery, the entire output supply power can become constant, and an input voltage (for example, a fuel cell output) can be controlled to become a constant voltage. Also, since an output voltage becomes stable at a set drooping point, stable power can be supplied to the load.

In addition, according to the DC-DC converter of the present invention, two converters, a converter for controlling supplied fuel cell power to be stable and a load-voltage-adjusting converter, are integrated by setting a single converter to have outputs. Thus, in a system that requires high efficiency, the high efficiency can be relatively easily realized.

The invention claimed is:

1. A DC-DC converter using, as an input source, a fuel cell, solar cell, having a relatively large output impedance in a power-supply mode, wherein the DC-DC converter includes an output to an arbitrary load and an output to a secondary battery, in which the outputs are wound around a winding, and based on magnetic coupling in which a turn ratio between the outputs determines voltage values of the outputs; a second converter is connected between an output of the secondary battery and the load; and a current control circuit connected to the secondary battery is configured to perform control so that, when a current in the load decreases due to an operation of the magnetic coupling, by increasing a charging current which flows into the secondary battery, and, when the current in the load increases, by decreasing the charging current to the secondary battery, an output voltage of the secondary battery is maintained at a set drooping voltage.

2. The DC-DC converter according to claim 1, wherein the current control circuit includes comparing means which outputs a control variable by comparing the output voltage of the secondary battery and a reference voltage, and a semiconductor switch which is turned on and off in response to the control variable and constant-current control means which performs constant current control of the secondary battery based on the turning on and off 3. The DC-DC converter according to claim 2, wherein the constant current control means includes first level conversion means which connects to an output portion of the comparing means, in which the first level conversion means is connected to a positive output end of the secondary battery and to a control terminal of the semiconductor switch; second level conversion means is connected to an output terminal of the semiconductor switch, in which the second level conversion means is connected to a negative output end of the DC-DC converter and to a control terminal of a second semiconductor switch; an output terminal of the second semiconductor switch is connected to an input terminal of the secondary battery; and the DC-DC converter is configured to perform control so that, when the current in the load decreases, by increasing the charging current which flows into the secondary battery, and, when the current in the load increases, by decreasing the charging current to the secondary battery, the output voltage of the secondary battery is maintained at the set drooping voltage.

4. The DC-DC converter according to claim 1, wherein the DC-DC converter has a function of deleting a voltage of the input source, controlling by comparing the detected voltage with a voltage-control input capable of being arbitrarily set, and controlling an input voltage to be constant on the basis of a control variable.

5. The DC-DC converter according to claim 2, wherein the DC-DC converter has a function of detecting a voltage of the input source, controlling by comparing the detected voltage with a voltage-control input capable of being arbitrarily set, and controlling an input voltage to be constant on the basis of the control variable.

6. The DC-DC converter according to claim 3, wherein the DC-DC converter has a function of deleting a voltage of the input source, controlling by comparing the detected voltage with a voltage-control input capable of being arbitrarily set, and controlling an input voltage to be constant on the basis of the control variable.

* * * * *